Feb. 28, 1933.　　　H. A. HANSON　　　1,899,685
AUTOMATIC GEAR SHIFTING MECHANISM
Filed May 1, 1931　　　3 Sheets-Sheet 1
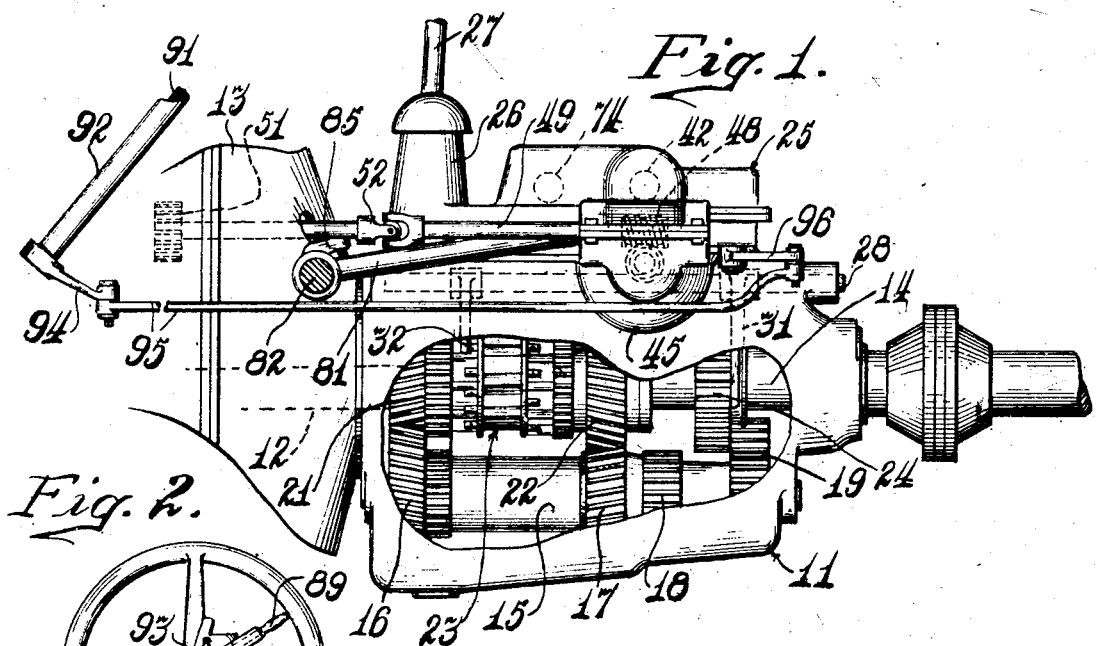
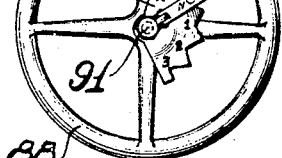
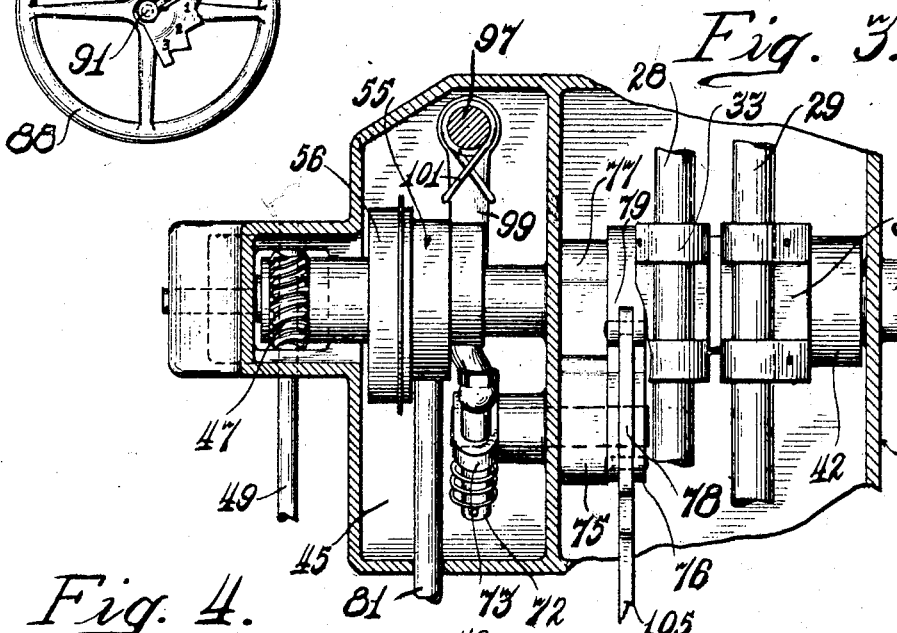
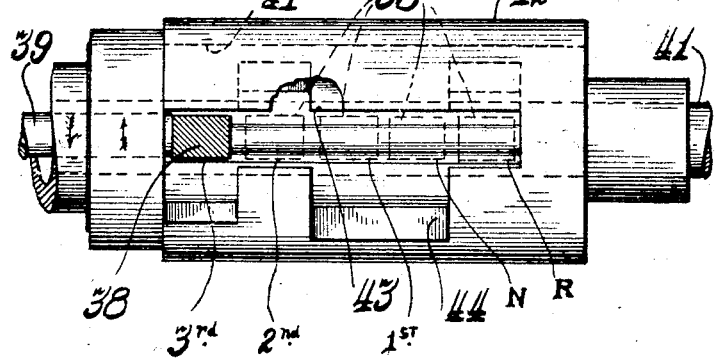
Inventor.
Hans A. Hanson
Attorney.

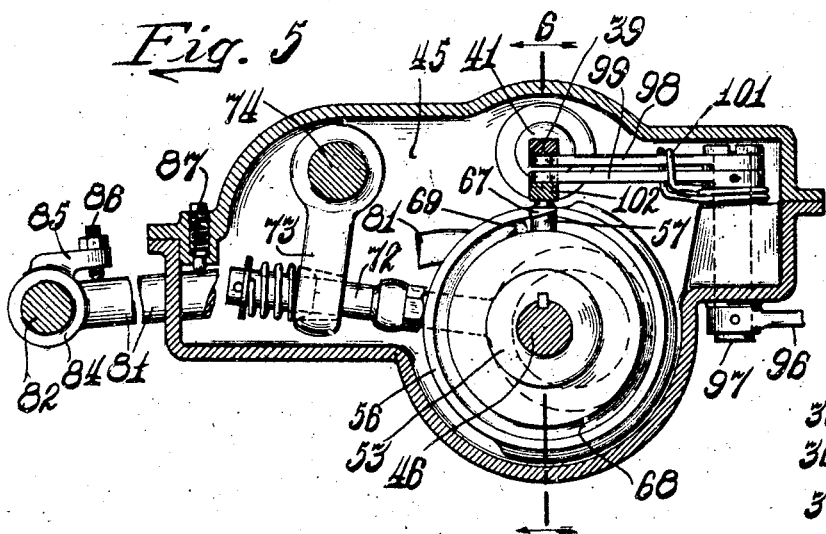
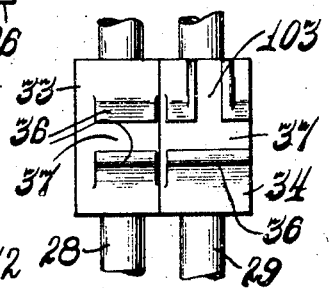
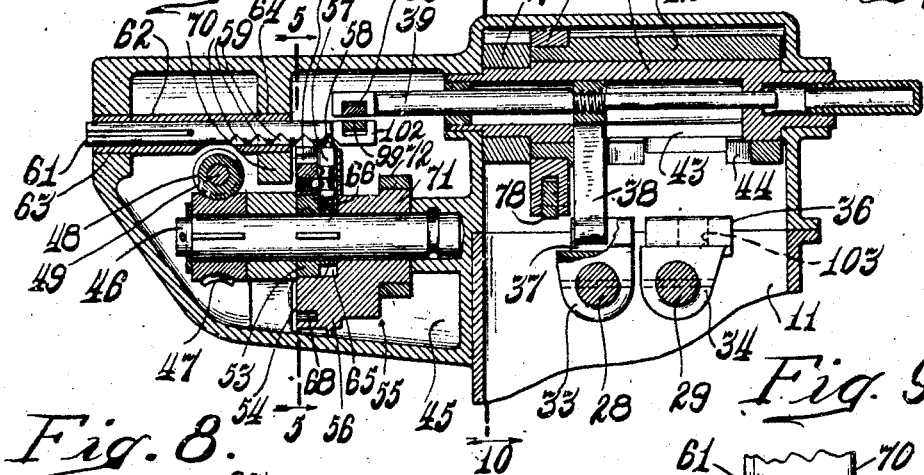
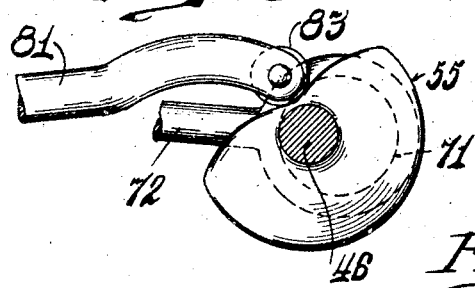
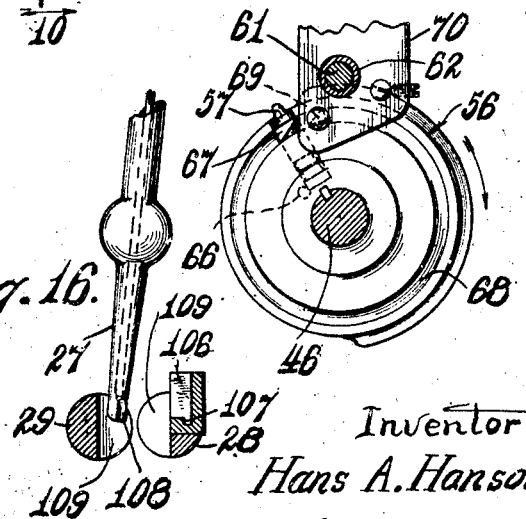
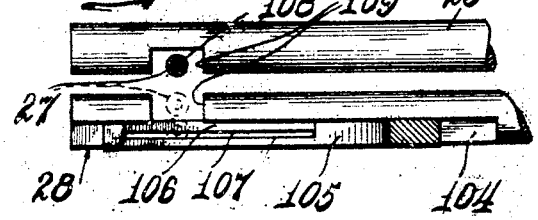
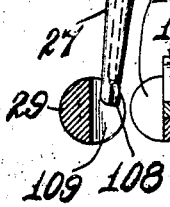

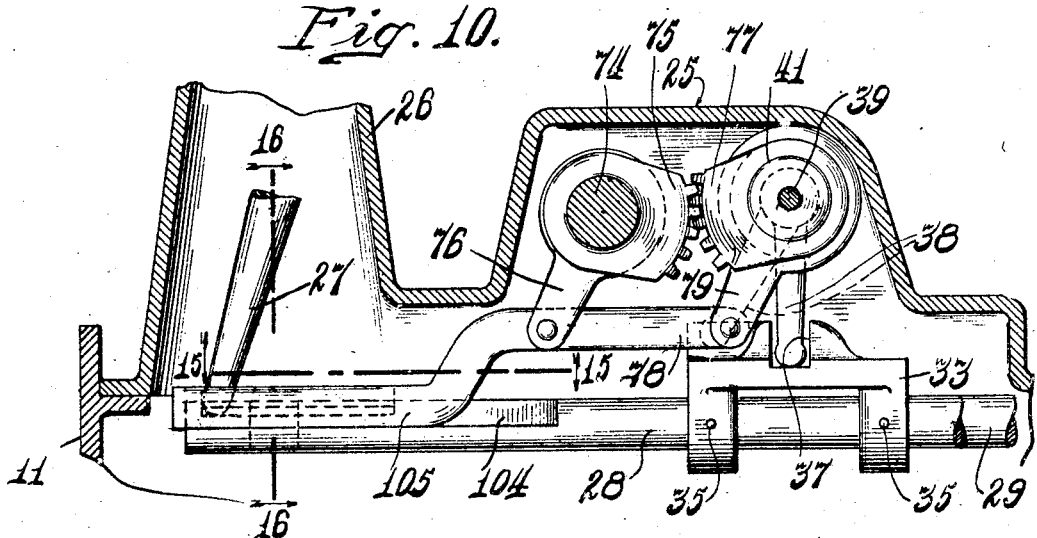
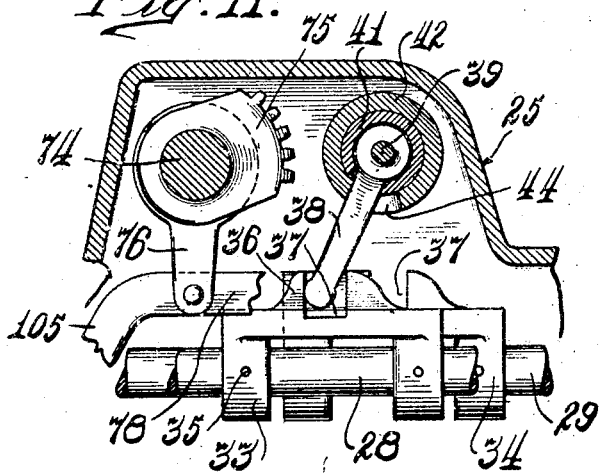
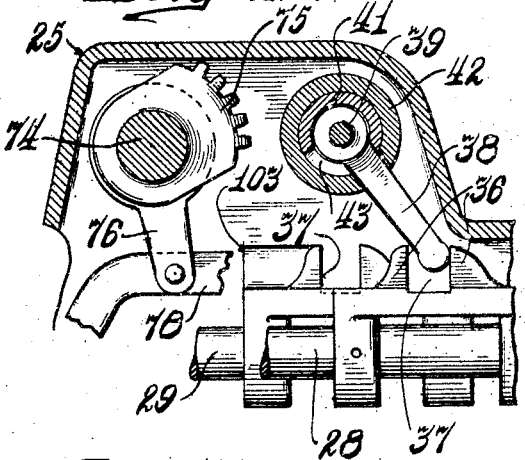
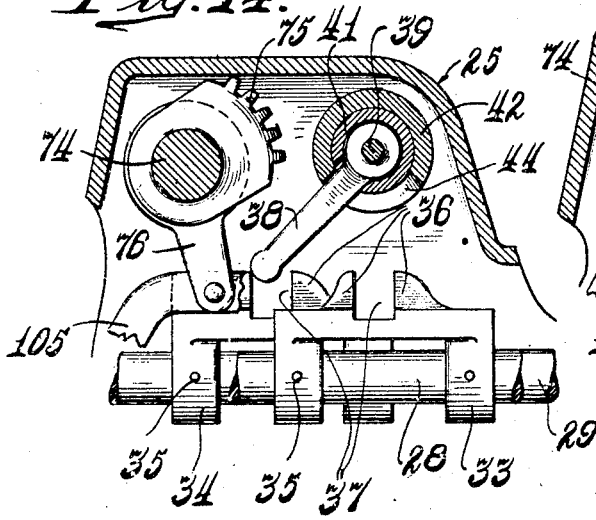
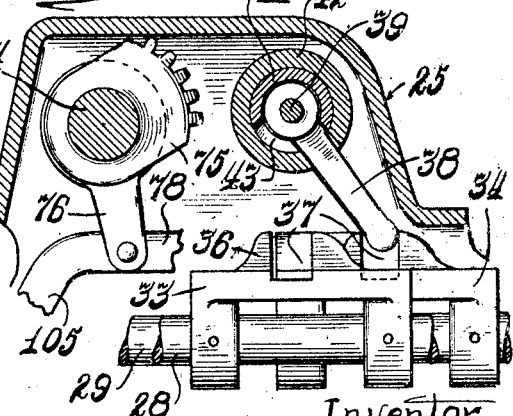

Patented Feb. 28, 1933

1,899,685

UNITED STATES PATENT OFFICE

HANS A. HANSON, OF MILWAUKEE, WISCONSIN

AUTOMATIC GEAR SHIFTING MECHANISM

Application filed May 1, 1931. Serial No. 534,238.

The invention relates to improvements in change speed gear transmissions and particularly to an automatic power operated device for moving the change speed gearing, having a manually operated control element arranged for convenient manipulation by the operator.

An object of the invention is to provide an improved power operated change speed gear shifting device for a change speed gear transmission having changeable sets of gears of the "free wheeling" or the customary shiftable type adapted to assume different relations to each other and to non-shiftable gears, operable upon actuation of manual controlled means.

Another object is to provide a change speed gear transmission of any known type with improved power operated means for moving or otherwise rendering inoperative sets of change speed gears.

Another object is to provide a power operated gear shifting device of the character referred to with means to disengage automatically the change speed gear transmission from the vehicle motor while said device is operating.

Another object is to provide a power operated change gearing device for a change speed gear transmission with means for rendering quickly the usual shift lever inoperable or operable independently of said device.

Another object is to provide a change speed gear transmission with an improved power operated change gearing device which is simply and durably constructed, positive in operation, and which may be installed readily on transmissions of the type having shiftable sets of gears, or the types known as "synchro-mesh" or "free wheeling" transmission.

The foregoing and such other objects of the invention as will appear hereinafter as the description proceeds, will be more readily understood from a perusal of the following specification, reference being had to the accompanying drawings, in which:

Fig. 1 is a side elevational view of a change speed gear transmission with a portion of the casing broken away, showing the improved power operated change gearing device mounted thereon.

Fig. 2 is a plan view of the steering wheel of a vehicle, showing the manual control mounted thereon.

Fig. 3 is an inverted horizontal sectional view of the improved power operated change gearing device.

Fig. 4 is an elevational view of the shift finger actuating sleeves.

Fig. 5 is a sectional view, taken on line 5—5 of Fig. 6, showing the gear shifting device actuating mechanism.

Fig. 6 is a longitudinal sectional view, taken on line 6—6 of Fig. 5.

Fig. 7 is a fragmentary plan view of the shift rods, showing the saddles thereon.

Fig. 8 is a detail view, showing the vehicle clutch actuated cam.

Fig. 9 is a fragmentary elevational view similar to Fig. 5.

Fig. 10 is a transverse sectional view, taken substantially on line 10—10 of Fig. 6, showing the shift rods in neutral position.

Figs. 11, 12, 13, and 14 are fragmentary sectional views similar to Fig. 10, showing the parts in the positions assumed while the transmission gearing is positioned for operating in third, second, reverse, and low speeds, respectively.

Fig. 15 is a horizontal sectional view, taken on line 15—15 of Fig. 10.

Fig. 16 is a vertical sectional view, taken substantially on line 16—16 of Fig. 10.

For the purpose of illustration, a conventional form of "free wheeling" transmission 11 is shown, permitting three speed gear changes, forward, one reverse, and an intermediate neutral position. As shown in Fig. 1, the change speed gear transmission, shown with the gears in neutral position, has a driving shaft 12 receiving its power through the usual vehicle clutch contained in the housing 13 located at the forward end of the transmission. The transmission also has a driven shaft 14 and a counter-shaft 15, the latter having gears 16, 17, 18, and 19 fixedly secured thereon. The drive shaft 12 is provided with a gear 21 meshing permanently with gear 16 for driving the counter-shaft 15. A gear 22, freely mounted on the driven shaft 14, meshes permanently with gear 17, and when the element 23 containing a "free wheeling" mechanism of known construction is moved into engagement with gear 22, power is transmitted to the driven shaft 14. When the "free wheeling" element 23 is moved in the opposite direction, the drive shaft 12 is connected directly with the driven shaft 14. Low and reverse speeds are obtained by shifting a gear 24, carried on the driven shaft 14, into mesh, respectively, with gear 18 on counter-shaft 15 or into engagement with reverse gearing 19.

It is the purpose of this invention to provide manually controlled power operated means for shifting the "free wheeling" element 23, or if conventional transmission is employed, the usual shiftable gear provided in place thereof, for operating in second and third speeds, and the gear 24 for operating in first or reverse speeds.

The improved mechanism preferably is contained in a suitable housing 25 adapted to be mounted upon the open top of the transmission casing 11 in place of the usual cover plate, said housing having vertically disposed tubular portion 26 on its forward end for receiving the usual gear shift lever 27. This lever ordinarily co-operates with the usual gear shifting rods 28 and 29, carrying shifting yokes 31 and 32 engaging, respectively, the gear 24 and "free wheeling" element 23. With the improved device the gear shift lever 27 is not employed. However, it is desirable that such a lever be retained to enable the operator to change the gears by hand independently of the power operated gear shifting device.

Each of the shifting rods 28 and 29 is provided with a suitable saddle 33 and 34, respectively, fixedly secured thereon by pins 35. Each saddle 33 and 34 has opposed shoulders 36 on its upper face providing a recess 37 for receiving a shifting finger 38, mounted on a longitudinally reciprocable oscillatable shaft 39.

As shown in Fig. 4 and 6, the shaft 39 is journaled in a sleeve 41, having its reduced ends journaled in suitable bearings provided in the housing 25. A second or outer sleeve 42 is freely mounted over sleeve 41, and each sleeve is provided with an irregular longitudinal slot 43 and 44, respectively, through which the shifting finger 38 extends. The sleeves 41 and 42 are adapted to be rotated oscillatably in opposed directions upon actuation of suitable power operating means to be described in detail hereinafter, whereby the shifting finger, by reason of the irregular slots 43 and 44, moves one or the other of the shift rods 28 and 29 to change the speed gearing.

To obtain such movement, the housing 25 has an enlarged chamber 45 extending beyond one side of the casing 11 below the top edge thereof, as shown in Figs. 1 and 6. Mounted for free rotation within the chamber 45 is a stud shaft 46, having on one end a fixed spiral gear 47 permanently meshing with a worm gear 48 carried upon a shaft 49 extending at right angles to stud shaft 46. The shaft 49 extends forwardly through one wall of the chamber 45 and into the vehicle clutch housing 13, through which the shaft 49 receives its power through a gear 51 carried on its end, which meshes with a gear (not shown) on the cam shaft or on the main drive shaft of the motor. A universal coupling 52 is provided on the shaft 49 to take care of any misalignment between the transmission and the clutch housing and prevent distortion of the shaft 49.

Also fixedly mounted on the stud shaft 56 is a collar 53 having a reduced diameter 54. Freely mounted upon the stud shaft 46, adjacent collar 53, is a cam element 55 having an enlarged diameter 56 formed with an axial recess to receive the collar 53 freely therein. The enlarged diameter 56 has a reciprocable plunger 57 mounted therein, which normally is held extended, as shown in Figs. 5 and 6, with its rounded outer end 58 extending into one of a plurality of notches 59 formed in one side of a slide rod 61 carried in a sleeve 62 mounted at 63 and 64 in chamber 45.

Manually operable selective control means, to be described in detail hereinafter, is provided to move the slide rod and depress the plunger 57 to move its innermost end into the recess 65, provided by the reduced diameter 54 on collar 53. As the collar 53 rotates, a pin 66 carried thereon engages the plunger, and the cam element 55 is rotated with the collar 53. It is desired that the cam element be disengaged upon completion of one revolution and to this end the plunger 57 is provided at its upper end with a finger 67 extending toward the face of the enlarged diameter 36 of cam element 55.

The face of the enlarged diameter 56 has an annular groove 68, into which extends a pin or cam 69 carried by a flange 70 depending from the wall of chamber 45. Upon reference to Figs. 5 and 9, it will be noted that the pin 69 is disposed to one side of the vertical center of shaft 46. While the plunger 57 is in its depressed position the finger 67 thereon is in the path of pin 69, and as the cam element 55 is carried around with collar 53, the finger 67 strikes pin 69 and is urged outwardly, thus bringing its innermost end out of the path of pin 66 on collar 53.

The cam element 55 has an eccentric 71, yieldably connected by a link 72 with an arm 73, mounted on a rotatable shaft 74 journaled in the housing 25. The shaft 74, as shown in Fig. 3, extends through the wall of the housing 25 and has, mounted on its inner edge, a gear sector 75 and an arm 76. The gear sector 75 meshes with a similar gear sector 77 fixedly mounted on the inner sleeve 41; and a link 78 connects arm 76 with a similar arm 79 fixedly secured to the outer sleeve 42. It can readily be understood, upon reference to Fig. 10, that rocking of shaft 74 imparts oscillatable rotation in opposed directions to sleeves 41 and 42, for actuating the shift finger 38 to effect a change in the speed gearing as heretofore described.

When changing the gearing in the "free wheeling" transmission shown, from neutral position to reverse or low positions, or vice versa, it is necessary to disengage the transmission from the motor. Such disengagement is accomplished by a link 81 freely mounted on the clutch actuating shaft 82 having a roller 83 on its free end co-operating with cam element 55. This connection is clearly illustrated in Figs. 5 and 8. The shaft 82, being free to rotate independently of the link 81 upon actuation of the usual foot operated clutch pedal affixed thereto (not shown) for operating the clutch, is operatively connected with link 81 by providing, on said shaft, a collar 84 with a lug 85 having an adjustable stop 86 engageable by link 81 when the latter is raised by actuation of cam element 55. The roller 83 is held yieldably against the cam element 55 by a spring pressed plunger 87 carried in the housing 25, as shown in Fig. 5.

Changing of the gearing, to operate at different speeds, is effected by the shift finger 38, as heretofore mentioned. Selective changing of the gearing necessitates means for positioning the shift finger for co-operative engagement with the saddle mounted on the shift rod, associated with the gearing to be changed.

Such shifting of the shift finger 38 preferably is accomplished by suitable manually operable selector means provided upon the steering wheel 88. As shown in Fig. 2, the selector preferably includes an operating handle 89, fixedly mounted upon a shaft 91, extending through the steering post 92. The handle 89 is adapted to be moved about its mounting for selective engagement with a plurality of notches on a segment 93 carried on the steering post. As shown, the notches in segment 93 are suitably marked to indicate the notch to be engaged by the operating handle 89 for effecting proper changing of the gearing.

The lower end of shaft 91, upon which handle 89 is mounted, carries an arm 94 connected by link 95 with an arm 96, fixedly secured to a stud shaft or pin 97 journaled in a suitable bearing in housing 25. The end of the pin or stud shaft 97 extending into the housing 25 carries a pair of levers 98 and 99, the latter being fixedly secured to said shaft and movable therewith. The lever 98 is yieldably connected with lever 99 by a spring 101, and any movement imparted to the lever 99 is transmitted through spring 101 to lever 98.

The free end of the lever 99 engages in a yoke 102 on the end of slide rod 61, and manipulation of the operating handle 89 moves the rod 61 longitudinally to effect depression of plunger 57, for actuating the cam element 55 to effect shifting. The distance the handle 89 is moved determines the position of the shift finger 38, relative to the saddles 34 and 35.

The lever 98 engages in a yoke on the protruding end of the reciprocable shaft 39 carrying the shift finger 38. Movement of lever 98 imparts a corresponding longitudinal movement to shaft 39 moving the shift finger longitudinally of the irregular slots 43 and 44, in the reciprocable sleeves 41 and 42, to its proper position for engagement with one or the other of the shift rod saddles 33 or 34.

It can be understood from the foregoing that upon manipulation of the operating handle 89, the cam element is actuated to disengage the vehicle clutch and rotate the sleeves 41 and 42. Rotation of the sleeves carries the shift finger to move the shift rod and its associated gears into neutral position. This movement aligns the recesses in the saddles and, as the lever 98 for moving the shift finger longitudinally is under spring tension, the finger slides into the position selected by the positioning of the operating handle 89.

The operation of the improved gear shifting device is substantially as follows: assuming the operating handle 89 to be in neutral position, the cam element 55 is free of collar 53 and the shifting finger 38 assumes the position shown in dotted lines in Fig. 10 with its end extending into a recess 103 on the upper face of saddle 34 shown in Fig. 7. The handle 89 is now moved to engage in the notch marked "1" on the plate 93, thus immediately connecting the cam element 55 with the collar 53, to oscillate sleeves 41 and 42. Such movement of the sleeves carries the shifting finger into alignment with the slots 37 in the saddles 33 and 34 (Fig. 10), and because of the tension placed upon lever 98, the shifting finger is moved quickly into the position shown in dotted lines and marked "1st" in Fig. 4, for changing the gearing to operate in first speed upon further movement of sleeves 41 and 42. Upon making one revolution the cam element 55 is disengaged and the parts remain as positioned.

The parts remain in this position until the operating lever 89 is again manipulated to engage the notch marked "2". The cam element 55 is again rotated to oscillate the sleeves 41 and 42, bringing the shifting finger again through the intermediate position illustrated in Fig. 10, into second speed position, as illustrated in Fig. 12.

Third speed operation is obtained by again manipulating the operating lever 89 to actuate the cam element 55 and rotate sleeves 41 and 42, thus moving the shift finger 38 to carry the second speed gear into neutral position and slide the "free wheeling" element 22 into operative position. The position of the parts while operating in third speed is shown in Fig. 11. By moving the operating lever 89 into the position on the plate 93 marked "R" rotation of the cam element 55 carries the shift finger through the intermediate position shown in Fig. 10 into the position illustrated in Fig. 13. The various positions assumed by the shifting finger, relative to the irregular slots 43 and 44, are illustrated in full and dotted lines in Fig. 4.

It can readily be understood that the operation of the improved manually controlled power operated change gearing device is positive and accurate. There never is a possibility of the gears being positioned to cause damage to the transmission or other working parts, because each gear, or as in the "free wheeling" or "synchro-mesh", the member 22 thereof must be returned to neutral position before the succeeding speed gearing is obtained.

As previously stated, the shift lever 27 is retained to enable the operator to shift by hand. However, when the automatic power operated change gearing device is employed, this lever must be made inoperative, and such means is illustrated in Figs. 15 and 16. As shown, the link 78, connecting arms 76 and 79, extends forwardly substantially parallel with the shift rods 28 and 29. The shift rod 28 is cut-out, as at 104, for receiving the extension 105 on said link. The cut-out 104 is substantially longer than extension 105 to allow the rod to move independently thereof. The extension 105 is provided on its inwardly disposed side with the elongated recess 106 having a vertical shoulder 107 on its bottom face for engagement by a suitable yieldably mounted plunger 108 carried in the shifting lever 27. Engagement of the shoulder 107 by plunger 108 holds the lever 27 out of engagement with the shift rods 28 and 29 while the device is being automatically operated.

Hand operation may be resumed instantaneously upon releasing the plunger 108 and moving said shift lever into position for cooperation with cut-outs 109 in the shift rods.

Although an exemplary form of the improved device has been described in detail in the foregoing specification, and illustrated in the accompanying drawings, it is to be understood that the improved manually controlled automatic power operated change gearing device may embody numerous modifications in detail structure without departing from the spirit of the invention or the scope of the appended claims.

I claim:

1. In a change speed gear transmission of the type in which two shift rods are individually associated with sets of shiftable gears, power operated means to shift said gears comprising, in combination, a power operated shaft having a disengageable cam element thereon, oscillatably rotatable means actuated by said cam element, gear shifting means carried by said shift rods, means associated with and operable by said oscillatably rotatable means to engage selectively said gear shifting means, and manually controlled means for selecting the gear to be shifted and for connecting said cam element with the power operated shaft.

2. In a change speed gear transmission of the type in which shift rods are individually associated with a set of shiftable gears, a power operated change speed gear device comprising, in combination, a housing adapted to be mounted on the said speed gear transmission, a shifting finger cooperating with said shift rods, sleeves cooperating with said shift finger, means for oscillating the sleeves in opposite directions, and manual means for selectively positioning the shift finger relative to the shift rods and the sleeves.

3. In a change speed gear transmission of the type in which shift rods are individually associated with changeable gearing, a power operated change speed device comprising, in combination, a housing adapted to be mounted on said transmission, a sleeve journaled in said housing, a second sleeve on said first mentioned sleeve, a shifting finger, mounted in and slidable longitudinally of said sleeves extending through irregular slots therein, selectively engaging said shift rods, and power operated means in said housing to rotate oscillatably said sleeves in opposed directions to move said finger for shifting the selected shift rod.

4. In a change speed gear transmission of the type in which shift rods are individually associated with changeable gearing, a power operated change speed gear shifting device comprising, in combination, a housing adapted to be mounted on said transmission, a sleeve journaled therein, a second sleeve mounted on said first mentioned sleeve, a shifting finger in and slidable longitudinally of said sleeves extending through irregular slots therein selectively engaging said shift rods, manually operable means to move said shifting finger longitudinally, and power operated means in said housing to rotate oscillatably said sleeves in opposed directions to move said finger for shifting the selected shift rod.

5. In a change speed gear transmission of the type in which shift rods are individually associated with changeable gearing; a power operated manually controlled speed gear changing device comprising, in combination, a housing adapted to be mounted on said transmission, telescoping sleeves mounted in said housing, a shifting finger slidable longitudinally of and extending through an irregular slot in each of said sleeves, a power operated cam element, a rock shaft in said housing operable upon operation of said power operated cam element, a gear segment on said shaft meshing with a gear segment on one of said sleeves, an arm on the other sleeve connected by a link with an arm on said shaft, said gear segments and link providing means to rotate oscillatably said sleeves in opposed directions when said shaft is rocked, and manually controlled means to rock said shaft and to move said shifting finger for selective engagement with one of said shift rods.

6. In a change speed gear transmission of the type in which shift rods are individually associated with changeable gearing, a power operated manually controlled speed gear changing device comprising, in combination, a housing, a power operated cam element, telescoping sleeves in said housing, a shifting finger slidable longitudinally of and extending through irregular slots in said sleeves, a rock shaft in said housing operable upon operation of said power operated cam element, means connecting said sleeves independently with said rock shaft to rotate oscillatably said sleeves in opposed directions when said shaft is rocked, and operator controlled means to rock said shaft and to move said shifting finger for selective engagement with one of said shift rods.

7. In a change speed gear transmission of the type in which shift rods are individually associated with changeable gearing, a power operated manually controlled speed gear changing device including a shift finger engaging selectively said shift rods, oscillatable means for actuating said shift finger, said oscillatable means including a link extending substantially parallel with said shift rods, a shift lever for shifting said shift rods independently of said power operated speed gear changing device, and means in said shift lever engageable in said link to render said shift lever inoperative.

8. In a change speed gear transmission of the type in which shift rods are individually associated with shiftable gears, a power operated manually controlled speed gear shifting device including a shift finger engaging selectively said shift rods, oscillatable means for actuating said shift finger, said oscillatable means including a link extending substantially parallel with said shift rods, a shift lever for shifting said shift rods independently of said speed gear shifting device, said link having a slot therein for engagement by means in said shift lever to hold said shift lever inoperative while the power operated gear shifting device is operating.

9. In a change speed gear transmission of the type in which shift rods are individually associated with changeable gearing, a power operated change speed device on said transmission, a shifting finger actuated by said change speed device, a saddle fixedly mounted one on each of said shift rods, means formed in said saddles adapted to be engaged selectively by said shifting finger for selective changing of said changeable gearing, and means in one of said saddles to allow actuation of said shifting finger without changing said changeable gearing.

10. In a device for utilizing the power of a vehicle engine for changing speed gears of a transmission, a drive shaft, means connecting the drive shaft with the engine, an operating member rotatable on the drive shaft, automatic means for disconnecting the operating member from the drive shaft after pre-determined movement of the shaft, shift rods, a shift finger, manual means for selectively positioning the finger relative to the shift rods and operatively connecting the operating member to the drive shaft, and means actuating the shift finger from the operating member.

11. In a device for utilizing the power of a vehicle engine for changing speed gears of a transmission, a drive shaft, means connecting the drive shaft to the engine, an operating member rotatable on the drive shaft, manual means for detachably connecting the operating member to the drive shaft for rotation therewith, automatic means for disconnecting the operating member from the shaft after pre-determined movement of the shaft, shift rods, a shift finger, manual means for selectively positioning the finger relative to the shift rods, means actuating the shift finger from the operating means, said actuating means including an eccentric connected with the operating member, an oscillating shaft, means operatively connecting the oscillating shaft with the shift finger, and means operatively connecting the eccentric and the oscillating shaft together.

12. In a device for utilizing the power of a vehicle engine for changing speed gears of a transmission, a drive shaft, means connecting the drive shaft to the engine, operating means rotatably mounted on the drive shaft, manual actuating means for detachably connecting the operating member with the drive shaft for rotation therewith, automatic means for disconnecting the operating member from the drive shaft after a pre-determined movement of the drive shaft, shift rods, a shift finger, manual means selectively positioning the finger relative to the shift rods, an oscillating shaft, means for actuating the shift finger from the oscillating shaft, a crank arm secured to the oscillating shaft having an opening there-through, an eccentric rotatable with the operating member, a pitman rod operatively connected to the eccentric and extending through the opening in the crank, spaced stops on the pitman rod arranged on opposite sides of the crank, and resilient means normally urging one of the stops toward the crank.

13. In a change speed gear transmission, a power driven shaft, a normally stationary member on the shaft, manually actuated means for detachably connecting the member with the shaft for rotation therewith, an eccentric connected for movement with said member, automatic means for disconnecting the member from the shaft after a single revolution thereof, an oscillating shaft, shift rods, a shift finger, means operatively connecting the finger with the oscillating shaft, and manual means operating in conjunction with said first named manual means for selectively positioning the finger relative to the shift rods.

14. In a device for utilizing the power of a vehicle engine for changing the speed gears of a transmission, the combination with a prime mover, a transmission, and a clutch for operatively connecting the engine with the transmission, said transmission including a power shaft, means for operating the power shaft from the engine, an operating member rotatably mounted on the power shaft, an eccentric rotatable with the operating member, a cam rotatable with the operating member, an oscillating shaft, shift rods, a shift finger, means operatively connecting the shift finger relative to the shift rods and for detachably connecting the operating member with the power shaft, automatic means for disconnecting the operating member from the power shaft after a single revolution thereof, means operatively connecting the eccentric with the oscillating shaft, and means operatively connecting the cam with the clutch.

15. In a device for utilizing the power of a vehicle engine for changing the speed gears of a transmission, a power shaft, means for driving the power shaft from a vehicle engine, an operating member rotatable on the shaft, a radially movable latch carried by the operating member, manual means for moving the latch into locking engagement with the shaft, means disposed in the path of the latch for moving the same out of engagement with the shaft upon one revolution of the shaft, shift rods, a shift finger, means operating in conjunction with the manual means for actuating the latch for selectively positioning the shift finger relative to the shift rods, and means for oscillating the shift fingers from the operating member.

In testimony whereof I affix my signature at Milwaukee, Wisconsin.

HANS A. HANSON.